(12) United States Patent
Walid et al.

(10) Patent No.: US 9,990,368 B2
(45) Date of Patent: Jun. 5, 2018

(54) SYSTEM AND METHOD FOR AUTOMATIC GENERATION OF INFORMATION-RICH CONTENT FROM MULTIPLE MICROBLOGS, EACH MICROBLOG CONTAINING ONLY SPARSE INFORMATION

(75) Inventors: Magdy Walid, Doha (QA); Kareem Darwish, Doha (QA); Ahmed Ali, Doha (QA)

(73) Assignee: Qatar Foundation, Doha (QA)

( * ) Notice: Subject to any disclaimer, the term of this patent is extended or adjusted under 35 U.S.C. 154(b) by 234 days.

(21) Appl. No.: 14/408,732

(22) PCT Filed: Aug. 6, 2012

(86) PCT No.: PCT/EP2012/065367
§ 371 (c)(1),
(2), (4) Date: Apr. 21, 2015

(87) PCT Pub. No.: WO2014/005657
PCT Pub. Date: Jan. 9, 2014

(65) Prior Publication Data
US 2015/0261773 A1 Sep. 17, 2015

(51) Int. Cl.
*G06F 17/30* (2006.01)
*G06Q 50/00* (2012.01)

(52) U.S. Cl.
CPC .. *G06F 17/30106* (2013.01); *G06F 17/30719* (2013.01); *G06F 17/30864* (2013.01); *G06Q 50/01* (2013.01)

(58) Field of Classification Search
CPC .................................................. G06F 221/2133
(Continued)

(56) References Cited

U.S. PATENT DOCUMENTS 5,463,725 A    10/1995  Henckel et al.
7,631,032 B1 * 12/2009  Refuah ............... G06F 17/3087
                                                    709/201
(Continued)

FOREIGN PATENT DOCUMENTS

WO    2010144618 A1    12/2010

OTHER PUBLICATIONS

Bermingham et al., "On Using Twitter to Monitor Political Sentiment and Predict Election Results", Proceedings of the Workshop on Sentiment Analysis where AI meets Psychology (SAAIP), IJCNLP 2011, Nov. 13, 2011, pp. 2-10.
(Continued)

*Primary Examiner* — Baoquoc N To
(74) *Attorney, Agent, or Firm* — The Webb Law Firm (57) ABSTRACT

A system and method for automatic generation of information-rich content from multiple microblogs, each microblog containing only sparse information, the method comprising collecting a population of microblogs comprising microblog data, each microblog containing a limited number of characters; providing a user interface allowing entry of a search query; matching a search query entered on the user interface to data in the microblog data; providing the results of the matching process as a sub-set of microblog data; applying processing techniques to the sub-set of microblog data; and generating a summary report of the processed sub-set of microblog data.

15 Claims, 6 Drawing Sheets

(58) Field of Classification Search
USPC .............................. 707/E17.095, 999.01, 705
See application file for complete search history.

(56) References Cited

U.S. PATENT DOCUMENTS

| | | | | |
|---|---|---|---|---|
| 8,554,618 | B1* | 10/2013 | Gasch ................ | G06Q 30/0241 705/14.4 |
| 2005/0221807 | A1* | 10/2005 | Karlsson ................ | H04M 3/42 455/418 |
| 2007/0168883 | A1 | 7/2007 | Sugimoto | |
| 2009/0055355 | A1* | 2/2009 | Brunner ................ | G06Q 30/02 |
| 2009/0276500 | A1 | 11/2009 | Karmarkar | |
| 2010/0306192 | A1 | 12/2010 | Kapur et al. | |
| 2011/0087693 | A1* | 4/2011 | Boyce ...................... | G06F 19/28 707/769 |
| 2011/0178995 | A1 | 7/2011 | Suchter et al. | |
| 2012/0011103 | A1 | 1/2012 | Joo et al. | |
| 2012/0254251 | A1* | 10/2012 | Barbosa ............ | G06F 17/30938 707/797 |
| 2012/0271847 | A1* | 10/2012 | Watanabe ......... | G06F 17/30743 707/769 |
| 2012/0278358 | A1* | 11/2012 | Watanabe ......... | G06F 17/30743 707/769 |
| 2013/0173526 | A1* | 7/2013 | Wong ................... | H04N 21/458 706/54 |
| 2013/0291127 | A1* | 10/2013 | Bergman ................ | G06F 17/30 726/30 |

OTHER PUBLICATIONS

Bollen et al., "Twitter mood predicts the stock market.", arXiv:, Oct. 14, 2010, pp. 1-8.
Conover et al., "Political Polarization on Twitter", Proceedings of the Fifth International AAAI Conference on Weblogs and Social Media, 2011, pp. 89-96.
Darwish et al., "Language Processing for Arabic Microblog Retrieval", CIKM '12, Oct. 29-Nov. 2, 2012, pp. 2427-2430.
Gayo-Avello et al., "Limits of Electoral Predictions Using Twitter", Proceedings of the Fifth International AAAI Conference on Weblogs and Social Media, 2011, pp. 490-493.
Han et al., "Lexical Normalisation of Short Text Messages: Makn Sens a #twitter", Proceedings of the 49th Annual Meeting of the Association for Computational Linguistics, Jun. 19-24, 2011, pp. 368-378.
"Meme Diffusion: a research project at Indiana University", Indiana University Bloomington. http://www.indiana.edu/comments/copyright.shtml.
Morris et al., "What Do People Ask Their Social Networks, and Why? A Survey Study of Status Message Q&A Behavior", CHI 2010: Using Your Social Network, Apr. 10-15, 2010, pp. 1739-1748.
Naveed et al., "Searching Microblogs: Coping with Sparsity and Document Quality", CIKM '11, Oct. 24-28, 2011, six (6) pages.
Dunis et al., "Overview of the TREC2011 Microblog Track", TREC-2011, 2011, five (5) pages.
Phelan et al., "Terms of a Feather: Content-based News Recommendation and Discovery Using Twitter.", Advances in Information Retrieval: 33rd European Conference on IR Research, ECIR 2011, Apr. 18-21, 2011, fourteen (14) pages.
Subasic et al., "Peddling or Creating? Investigating the Role of Twitter in News Reporting", ECIR 2011, LNCS 6611, pp. 207-213.
Teevan et al., "#TwitterSearch: A Comparison of Microblog Search and Web Search", WSDM '11, Feb. 9-12, 2011, ten (10) pages.
Tumasjan et al., "Predicting Elections with Twitter: What 140 Characters Reveal about Political Sentiment", Proceedings of the Fourth International AAAI Conference on Weblogs and Social Media, 2010, pp. 178-185.
Zhao et al., "Comparing Twitter and Traditional Media using Topic Models", Advances in Information Retrieval: 33rd European Conference on IR Research, ECIR 2011, Apr. 18-21, 2011, fourteen (14) pages.
Tamaki Ryota, "Social Versus Information System—Real Image of New IT Generation Approaching Closer to Personal", Nikkei Computer, Nikkei BP Company, Apr. 12, 2012, p. 42-47, No. 806, Japan (complete English-language translation).
"Development of Commercialization of Large-scale Distributed Processing Foundation for Big Data Utilization in Software Innovation Center at NTT", Business Communication, Business Communication Company, May 1, 2012, p. 68-17, vol. 49, No. 5, Japan (complete English-language translation).
Ikeda Kazusi et al., "A Method of Estimating Profiles of Senders of Twitter for Use of Market Analysis", Journal of Information Processing Academy, Journal translation, Year of 2011, Information Processing Academy General Incorporated Association, May 2, 2012, p. 82-93, vol. 2, No. 1, Japan (partial English-language translation).

* cited by examiner

SYSTEM AND METHOD FOR AUTOMATIC GENERATION OF INFORMATION-RICH CONTENT FROM MULTIPLE MICROBLOGS, EACH MICROBLOG CONTAINING ONLY SPARSE INFORMATION

CROSS-REFERENCE TO RELATED APPLICATIONS

This application is the United States national phase of International Application No. PCT/EP2012/065367 filed Aug. 6, 2012, and claims priority to United Kingdom Patent Application No. 1211853.5 filed Jul. 4, 2012, the disclosures of which are hereby incorporated in their entirety by reference.

Field of the Invention present invention relates to a system and method for topic-based analysis of information derived from microblogs. More particularly, the present invention relates to a system and method for automatic generation of information-rich content from multiple microblogs, each microblog containing only sparse information.

BACKGROUND OF THE INVENTION

A topic may be or concern an event such as a political election; a geographical location such as a tourist attraction; or an entity such as an individual or a corporate body. More wide rangingly: a topic can be identified from a user query representing a particular user's need for information—the topic could be a particular event: such as an election, a sports event or a natural disaster; or an entity: such as a person, a location, an organisation, a concept (such as a religion, a philosophy or a language); or a product.

Microblogs are a popular tool for users to post news, information or queries online for public (or private group) dissemination, review and reply. Twitter is a popular microblog site with over 300,000,000 microblogs each day being exchanged. A Twitter microblog or Tweet comprises a message of 140 characters.

The problem addressed by the present invention and implementations thereof is to provide for the conduct of a meaningful analysis and exploration of microblogs based on a user input.

Searching functionality in social networking sites in general and through microblogs specifically is basic and limited. This limitation is particularly pronounced when searching for a particular event or entity which has multiple facets or aspects, as most topics do. The search functionality that is currently implemented through microblogging sites and tools is a simple word-matching search that retrieves the most recent posts on a given query. Further, a user may obtain hundreds or perhaps thousands of hits comprising individual microblogs/posts in response to a given query. This leads to instant information overload and unusable search results.

Many microblog and social websites provide a search capability to users to allow them to find relevant posts using a word-matching search in response to a user query. The current state of the art in microblog searching returns as search results any recent posts that contain the search word/s. In this way, a user can be updated by recent posts mentioning the search term—a given event or certain entity—most recently. Microblog searching is discussed in:

N. Naveed, T. Gottron, J. Kunegis A. Alhadi. (2011). Searching microblogs: coping with sparsity and document quality. *CIKM*-2011; and M. R. Teevan, J., & Panovich, K. (2010). What do people ask their social networks, and why?: A survey study of status message Q&A behavior. *WSDM* 2011

The search scenarios in the microblog environment are limited and the information provided in any one microblog (140 characters perhaps) is sparse. Equally sparse on information are comments or posts on social networking sites. Nevertheless, attempts have been made to provide useful information derived from microblogs—a rich seam of social data. These attempts include:

Johan Bollen, Huina Mao, Xiao-Jun Zeng. Twitter mood predicts the stock market. arXiv 2010;

M. D. Conover, J. Ratkiewicz, M. Franscisco, B. Goncalves, A. Flammini, F. Menczer. *Political polarization on twitter.* AAAI-2011;

O. Phelan, K. McCarthy, M. Bennett, and B. Smyth. (2011). Terms of a feather: content-based news recommendation and discovery using twitter. ECIR 2011;

Daniel Gayo-Avello, Panagiotis T. Metaxas and Eni Mustafaraj, pmetaxas, (2011). *Limits of electoral predictions using twitter.* AAAI-2011;

Bermingham, Adam and Smeaton, Alan F (2011). On using Twitter to monitor political sentiment and predict election results;

Andranik Tumasjan, Timm O. Sprenger, Philipp G. Sandner, Isabell M. Welpe. Predicting Elections with Twitter: What 140 Characters Reveal about Political Sentiment. AAAI-2010; and Andranik Tumasjan, Timm O. Sprenger, Philipp G. Sandner, Isabell M. Welpe. Predicting Elections with Twitter: What 140 Characters Reveal about Political Sentiment. AAAI-2010.

Interest in microblog retrieval has significantly increased in recent years. Several studies investigated the nature of microblog search compared to other search tasks [N. Naveed, T. Gottron, J. Kunegis, A. Alhadi. (2011). Searching microblogs: coping with sparsity and document quality. CIKM-2011.] and [J. Teevan, D. Ramage, M. Morris. (2011). #Twittersearch: A comparison of microblog search and web search. WSDM 2011]. [N. Naveed, T. Gottron, J. Kunegis, A. Alhadi. (2011). Searching microblogs: coping with sparsity and document quality. CIKM-2011] illustrated the challenges of microblog retrieval, where documents are very short and typically focus on a single topic. [J. Teevan, D. Ramage, M. Morris. (2011). #Twittersearch: A comparison of microblog search and web search. WSDM 2011] highlighted the differences between web queries and microblog queries, where microblog queries usually represent users' interest to find updates about a given event or person as opposed to finding relevant pages on a given topic in a web search.

Due to this increased interest in microblog search, TREC introduced a new track focused on microblog retrieval in 2011 [I. Ounis, C. Macdonald, J. Lin, I. Soboroff. (2011). Overview of the TREC-2011 Microblog Track. TREC-2011]. The aim was to find the best methods for achieving high precision retrieval for microblog search. A collection of 14 million tweets from Twitter and a test set of 50 topics were provided for investigation [I. Ounis, C. Macdonald, J. Lin, I. Soboroff. (2011). Overview of the TREC-2011 Microblog Track. TREC-2011]. Although the track led to a variety of effective retrieval approaches, the issue of modelling the search scenario remains important as the TREC track setup models search like a standard ad-hoc retrieval task, which may be suboptimal [J. Teevan, D. Ramage, M. Morris. (2011). #Twittersearch: A comparison of microblog search and web search. WSDM 2011].

The absence of a sensible definition for a microblog search scenario led some researchers to create different useful tasks other than direct search. For example, [I. Subasic, B. Berendt. (2011). Peddling or Creating? Investigating the Role of Twitter in News Reporting. ECIR-2011] used tweets as a news source and compared them to other online news media to detect features for automatic news detection from Twitter. In [7], tweets were used to recommend news to users based on their preferences. In [J. Bollen, H. Mao, X-J. Zeng. (2010). Twitter mood predicts the stock market. Journal of Computational Science. 2(1)], users' mood on Twitter was utilized to predict stock market changes. Many other tasks have been suggested for achieving information gain to users based on social data from Twitter.

Other references of note are F. W. Lancaster, E. G. Fayen. (1973). Information Retrieval On-Line. Melville Publishing Co., Los Angeles, Calif.; O. Phelan, K. McCarthy, M. Bennett, and B. Smyth. (2011). Terms of a feather: content-based news recommendation and discovery using twitter. ECIR 2011; I. Subasic, B. Berendt. (2011). Peddling or Creating? Investigating the Role of Twitter in News Reporting. ECIR-2011; B. Han, T. Baldwin. (2011). Lexical Normalisation of Short Text Messages: Makn Sens a #twitter. ACL-HLT 2011; and W. X. Zhao, J. Jiang, Ji. Weng, J. He, E-P. Lim, Ho. Yan, X. Li. (2011). Comparing twitter and traditional media using topic models. ECIR 2011.

The Twitter microblog uses "hashtags"—"The # symbol, called a hashtag, is used to mark keywords or topics in a Tweet. It was created organically by Twitter users as a way to categorize messages."—source: www.twittercom. In other words, a user creates a hashtag by prefixing a term with a # symbol to identify the prefixed term as the intended topic of that microblog. The hashtag can be seen as a "Subject:" line or topic identifier so that other users can search for that particular hashtag to identify further microblogs referencing the same hashtag. More than one hashtag can be present in a single microblog.

Many microblog and social websites, such as Twitter, provide search capabilities to allow users to find relevant posts that match their information need. The currently implemented microblog search on Twitter provides recent tweets that match search words. A user may elect to search (or follow) for specific entities, persons, or events, via the use of hashtags "#tag" or name mention "@user", to get continuous updates [J. Teevan, D. Ramage, M. Morris. (2011). #Twittersearch: A comparison of microblog search and web search. WSDM 2011]. One disadvantage of this kind of search is that a query may yield a large number of tweets, overwhelming the user. In this scenario, a user is presented with a flat list of matching tweets (tweets and microblogs are used interchangeably in the paper), leaving much to be desired, such as time span, the tweet sentiment and topic modelling.

Some sites allow searching by hashtags, in which case, the hashtags are used as keywords: http://truthy.indiana.edu/. This website provides a tool for analysing a population of microblogs for hashtags and plots a link graph between a hashtag forming a user query and other hashtags that co-occur within each microblog. The website also allows a user to search for a hashtag and then displays recent tweets that contain the given hashtag, as well as an indication of the distribution of how many times the searched hashtag is mentioned over time.

The main shortcoming of the current technology is that a search through microblogs provides only the most recent hits (relevant posts) based on a given user search query. Searching social content and social networking site content in general and microblogs (aka tweets) in particular has been basic and limited, especially for time-sensitive topics. The currently implemented microblog search on sites such as Twitter is based on simple word matching and retrieves the most recent microblogs that match a given query.

Furthermore, a user may obtain hundreds or perhaps thousands of microblogs in response to a given query, leading to information overload. The problem with this scenario is that there will typically be a large number of relevant posts for any one search term and a user will be swamped by the volume of returns—so-called "information overload". It is a technical problem to present relevant search results without providing an overwhelming volume of relevant search results.

A typical reaction of a user faced with a large number of hits is to narrow the search down by using more specific search terminology, i.e. longer or plural hashtags. This means that a user receives updates on a very specifically defined topic presented as a hashtag. The present systems provide too many relevant hits to be useful and relatively little information content. The situation is analogous to not being able to see the wood for the trees, where the trees are the relevant hits and the wood is the information being sought.

There is, therefore, a desire to overcome one or more of the problems associated with the prior art and create, for example, a system and method for topic analysis based on information derived from microblogs.

The technical solution is to present a system and method of searching microblogs embodying the present invention. The solution provides for a search to be conducted which leads to more useful information being gained by the user compared to current systems which return an overwhelming number of relevant hits but little in the way of useful information for a user.

Embodiments of the present invention seek to ameliorate one or more problems associated with the prior art.

SUMMARY OF THE INVENTION

An aspect of the present invention provides a method for automatic generation of information-rich content from multiple microblogs, each microblog containing only sparse information, the method comprising: collecting a population of microblogs comprising microblog data, each microblog containing a limited number of characters; providing a user interface allowing entry of a search query; matching a search query entered on the user interface to data in the microblog data; providing the results of the matching process as a sub-set of microblog data; applying processing techniques to the sub-set of microblog data; and generating a summary report of the processed sub-set of microblog data.

In embodiments of the invention, the method further comprises: dividing the sub-set of microblog data into different categories of microblog; and incorporating results for each of the different categories in the summary report.

Preferably, natural language processing is used, such as: text normalization; named entity recognition; keyword/keyphrase extraction; or sentiment analysis.

A further aspect of the invention provides a system for automatic generation of information-rich content from multiple microblogs, each microblog containing only sparse information, the system including: a computing device having a processor and a memory: and a storage device, the computing device being configured to perform the method for automatic generation of information-rich content from multiple microblogs, each microblog containing only sparse information, the method comprising: collecting a population of microblogs comprising microblog data, each microblog containing a limited number of characters; providing a user interface allowing entry of a search query; matching a search query entered on the user interface to data in the microblog data; providing the results of the matching process as a sub-set of microblog data; applying processing techniques to the sub-set of microblog data; and generating a summary report of the processed sub-set of microblog data.

In embodiments, the system further includes a visual display for displaying an interface to a user, and to receive a search query from a user, such that the input of a search query by the user causes the computing device to output to the interface a summary report of the processed sub-set of microblog data corresponding to the search query.

Another aspect of the present invention provides a computer-readable medium storing instructions which when executed to run on a processor cause the processor to perform the steps according to the method for automatic generation of information-rich content from multiple microblogs, each microblog containing only sparse information, the method comprising: collecting a population of microblogs comprising microblog data, each microblog containing a limited number of characters; providing a user interface allowing entry of a search query; matching a search query entered on the user interface to data in the microblog data; providing the results of the matching process as a sub-set of microblog data; applying processing techniques to the sub-set of microblog data; and generating a summary report of the processed sub-set of microblog data.

Another aspect of the present invention provides a search tool operable to generate automatically information-rich content from multiple microblogs, each microblog containing only sparse information, the tool comprising: a collection of microblogs comprising microblog data, each microblog containing a limited number of characters; a user interface allowing entry of a search query; a matching processor to match a search query entered on the user interface to data in the microblog data; a result set comprising a matched sub-set of the microblog data; and a report generator to applying processing techniques to the result set to generate a summary report of the processed sub-set of microblog data.

Another aspect of the present invention may provide a topic-based microblog analysis tool.

BRIEF DESCRIPTION OF THE DRAWINGS

Embodiments of the invention will now be described, by way of example only, with reference to the accompanying drawings, in which.

DETAILED DESCRIPTION OF THE INVENTION

Embodiments of the present invention provide a new multidimensional microblog search tool that generates a comprehensive report from microblogs instead of a flat list of recent/relevant microblogs for a given query. Reports may include tag-clouds, topic time series, and most popular and funny microblogs and an analysis of those displaying sentiment. The tool can be configured for monitoring time-sensitive topics using a set of predefined queries. Embodiments of the present invention provide a user experience that is different from the tweet search available from Twitter.

A search scenario embodying the present invention leads to significant information gain to the user compared to the current scenario, for example a word search through most recent microblogs. This disclosure deals with scenarios involving more general queries and information needs (requiring more than a simple hashtag or user mention search); and the outcome is a more comprehensive summary of hits for the search query in the microblog domain or social media in general which is more rich in information than just a simple list of results.

Figure 1:
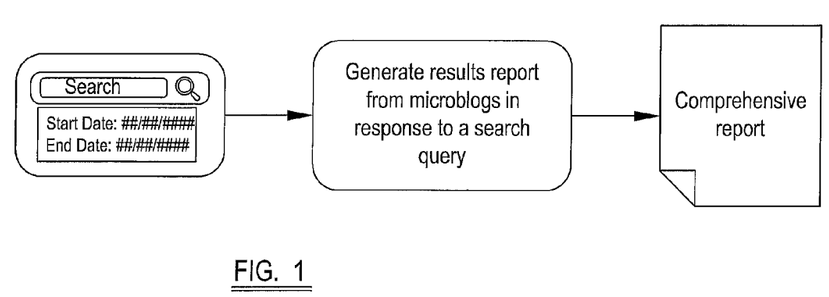
FIG. 1 is a schematic overview of a user interface for use with an embodiment of the present invention.

Referring to FIG. 1, embodiments of the invention provide a summary on demand from microblog data based on a given information need, a user search query. A user query, that represents the user's information need, may be a particular event such as elections, sports events, public catastrophe . . . etc. or entity such person, location, organisation, or product . . . etc. The given query specifies time span (with begin and end time). It may also include additional information such as: geographical location, language, social community/group, broad category (politics, sports, etc.), age grouping, etc. The summaries from social content that matches the information need may include but not limited to:

Top posts (most posted microblogs/messages)
Top posts per class. Class may be a sentiment such as: positive, negative, funny, sad . . . etc., sub-topics, geography, etc.
Top circulated videos and images in posts
Top circulated links in general
Top mentioned terms and phrases with the query searched for
Statistics about the entity/event over time.
In further detail embodiments of the invention provide:
Survey on demand for a social-cultural event from a micro blogging, e.g. twitter
Navigate the results over time and see a change in mood and correlate with on-going big events.
Extract most popular information about an event from twitter:
  i. Top tweets
  ii. Funny tweets
  iii. Top videos
  iv. Top links
Embodiments of the invention can be implemented as:
Public website; users can make a specific query for any event and get relevant information presented in a report, see FIG. 4.
Enterprise solution; where the application will be built for customer and can use it for business related topics such as market survey and customer comments and emotion about certain aspects of products, news website interested in certain topic . . . etc However, embodiments of the invention can also be implemented by other means such as applets, apps and bespoke desktop solutions.

Embodiments of the invention can provide:

Public event monitoring using fixed and predefined search queries to the system.

Information need can be expressed as a user query that may be a particular event or entity, or it can also be a news article; a user's preference based on the user's history, settings, or implicit or explicit input; a microblog; a picture; or a video.

Extension for larger size blogs

Referring to FIG. 1, the outcome of using embodiments of the invention is a more comprehensive summary of the search query used to search the microblog domain (or a social media domain) and richer information content than just a simple list of relevant results. This disclosure provides a new system and method for generating reports from microblogs that represent or summarise the search results instead of a list of recent posts that match the query. Microblogs are described with reference to "tweets" appearing on "Twitter" but microblogs are not limited to this environment and can also comprise other forms of user generated content (UGC) such as: a post on a social networking site; a comment on a news article; a comment or a post on a forum; and/or a comment on a social networking site.

Embodiments of the present invention provide a microblog search tool, system and method of indexing that generates a comprehensive report in response to a given search query based on indexed microblog data.

Figure 2:
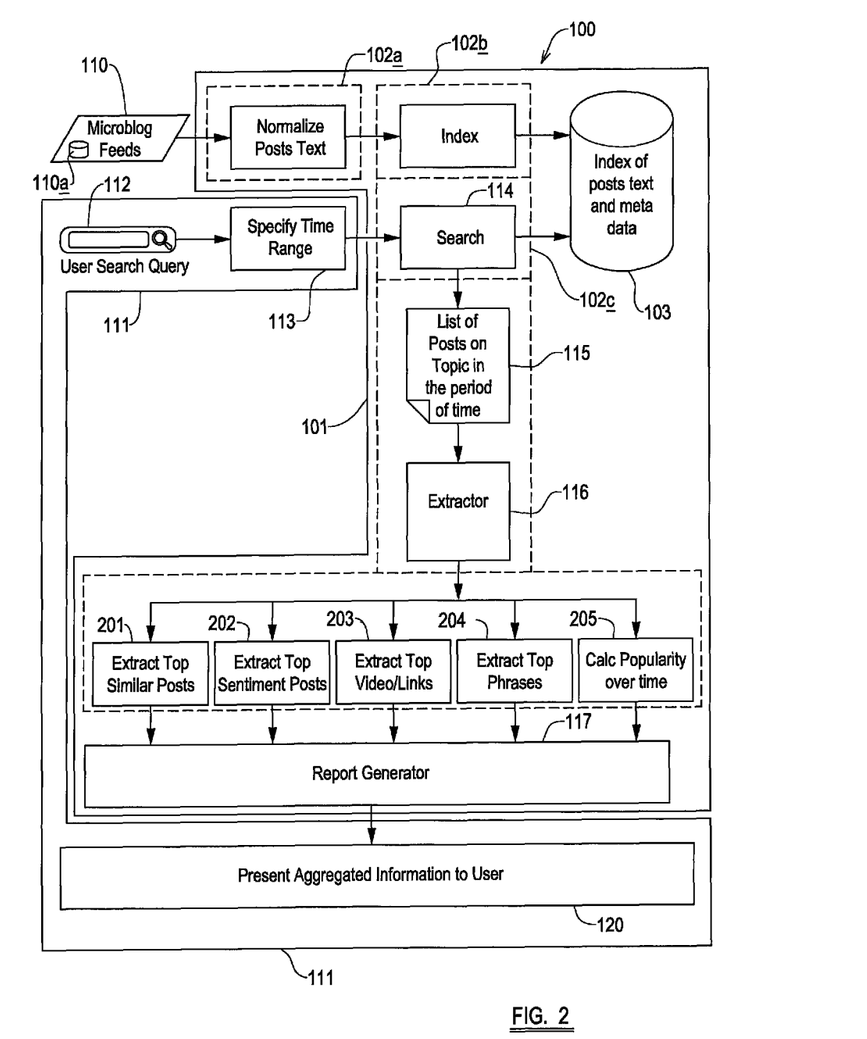
FIG. 2 is a schematic overview of a system embodying the present invention.

FIG. 2 presents a basic system architecture for a system 100 embodying the present invention for automatically generating a comprehensive report in response to a user search query. The system 100 comprises one or more computing devices 101, each including a processing arrangement 102 with associated storage 103, and at least one of the computing devices 101 may include one or more input devices.

In the embodiment shown in FIG. 2, the input devices comprise two inputs: a microblog feed 110 and a user interface 111.

The microblog feed 110 may in some embodiments be a live feed of microblogs or in other embodiments may be a saved database of microblogs mirrored or compiled from a live feed of microblogs.

The microblog feed 110 makes a population of microblogs together with their associated metadata available to the system 100. For example, the microblog feed 110 is of microblogs from the Twitter website ("tweets") which are collected for a given language and saved in a database 110a in the feed 110. Tweets are collected by issuing generic queries, such as "lang:xx" (ex. "lang:ar" for Arabic) against Twitter, which retrieves tweets in a given language. Collected tweets contain the author ID, tweet ID, timestamps, etc.

A normaliser processor 102a is located downstream of the microblog feed 110. The normaliser processor 102a normalises the text of the microblogs (the "Tweet text") from the database 110a using advanced text normalization techniques operating on the informal or slang language that is used in tweets and social media in general. For example, English language normalisation can be used as described in [B. Han, T. Baldwin. (2011). Lexical Normalisation of Short Text Messages: Makn Sens a #twitter. ACL-HLT 2011] and for Arabic as described in [K. Darwish, W. Magdy, A. Mourad. (2012).—Language Processing for Arabic Microblog Retrieval. CIKM 2012]

The normalization process can also operate on emoticons. Emoticons are commonly used in microblogs reflecting the sentiment of a blogger. Microblogs can be normalised and sentiment displayed in a microblog is detected from use of emoticons and language.

TABLE 1

Normalizing happy/sad emotion words:
   Happy :)
   :), :-), :-)), :D, :d, ˆ_ˆ, lol, loool, hahaha, ...
   Sad :(
   :(, :-(, :--((, :(, :" (, ...

An indexer 102b then indexes the normalized tweets together with their metadata, such as author ID, time stamp, and tweet ID. In embodiments, normalized tweets are indexed along with their metadata. A retrieval system is configured to use a simple Boolean retrieval model [F. W. Lancaster, E. G. Fayen. (1973). Information Retrieval On-Line. Melville Publishing Co., Los Angeles, Calif.] instead of a ranking model because the system should operate on and analyse "all" tweets that match a query in a given time window as opposed to a top ranking selection.

A data storage facility 103 is fed with and holds the normalised and indexed microblogs.

As will be appreciated, the user interface 111 provides for search query entry 112, allowing a user to input a search query, or choose a search query from a drop-down list of pre-selected or pre-generated search queries. A user provides a search query, which would preferably be an entity or an event, or could be a hashtag (#tag), a name mention (@some_user), or a free-form query.

Queries used for the system can be rich Boolean. Boolean queries, although they require time to construct manually, do not require training and can help disambiguate entities or events than may be referred to in multiple topics. For example, searching for the French president "Hollande" can retrieve many tweets referring to different persons carrying the same name. The Boolean query can be formulated as: "Hollande AND (François OR France OR president)" to disambiguate the entity.

In addition to search query entry 112, the user interface 111 incorporates an optional time window filter 113 which is operable by the user to limit search results down to a specific time window. Note that the metadata for microblogs incorporates a time stamp allowing microblogs to be categorised by date of creation or posting. If there is no user input to the time window filter 113, then a default time window is preferably set by the filter 113. In embodiments, the default time window is set as from the present time on the current day back to midnight of the previous day. Other default time windows can be preset or defined as simply "the last 2, 4, 6, 12 hours".

In combination, the search query entry 112 and the time window filter 113 generate a composite search query 114 which is transmitted from the user interface 111 for interrogation of the index database 103.

All resulting microblogs satisfying the composite search query 114 in any specified time window are retrieved from the index database 103 and present a fresh population 115 of indexed microblogs. An extractor module 116 serves to analyse the retrieved population 115 and extract at least some of the following information from the retrieved population:

1. 201—Top posted messages (tweets/microblogs), where limited textual variation in the phrasing of tweets is permitted.
2. 202—Top posted messages that contain sentiment material such as funny emoticons.

For 1 and 2, all retrieved tweets for a given search query are grouped to aggregate all similar tweets into the same group. For a fast and robust matching between tweets, an additional normalization step is applied which involves case-folding and removal of all hashtags, name mentions, URLs, punctuations, symbols, emoticons, and retweet symbols. Tweets that match exactly after normalization are grouped together. Groups are presented in ranked order (in descending order) by their size with the most common tweet form as the representative of the group along with the number of tweets in the cluster. Top funny tweets (sentiment tweets) are extracted in the same manner and clustering is applied to those tweets that have smiley emoticons only.

3. 203—Most circulated links (such as videos) in the tweets.

The URLs in the tweets of the top 100 clusters are extracted. Since URLs in tweets are typically shortened and some URLs may have multiple shortened forms, all URLS are expanded to reveal the original URLs. URLs pointing to a video hosting site such as YouTube are used to obtain a ranked list of the most popular videos, for example, which can then be embedded in the resultant report. Other URLs are extracted and their titles are presented and ordered by the number of appearances in tweets along with their links and number of appearance. Different categories of links pointing to non-video material are also possible so links to news stories, audio clips, geographic locations can also be ranked and incorporated in a report. For example, the most frequently occurring place names or geographic co-ordinates could be shown on a map in the report.

4. 204—Most frequent terms/phrases appearing in tweets.

For Arabic, a base-phrase chunker is used which is akin to AMIRA [M. Diab. (2009). Second generation tools (AMIRA 2.0): Fast and robust tokenization, POS tagging, and base phrase chunking. MEDAR 2009.] to extract noun-phrase. For English, Open Calais is used to extract keywords/keyphrase. Extracted noun-phrases and/or keywords/keyphrases are sorted by their frequency and are displayed in a tag-cloud, see FIGS. 4 and 5 for different format tag-clouds. Hashtags and name mentions are included but URLs are excluded from this report category.

5. 205—The popularity of the search topic over time.

Figure 4:
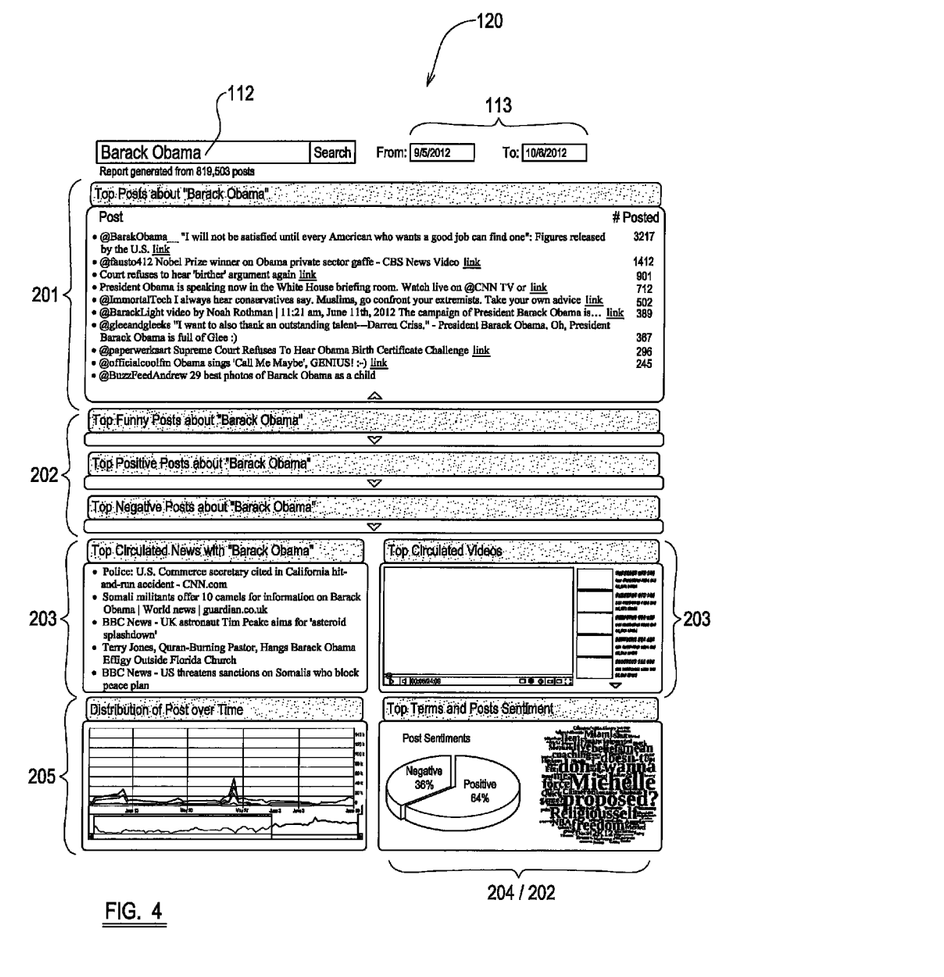
FIG. 4 is an example of a preferred sample output report according to an embodiment of the present invention.
Figure 5:
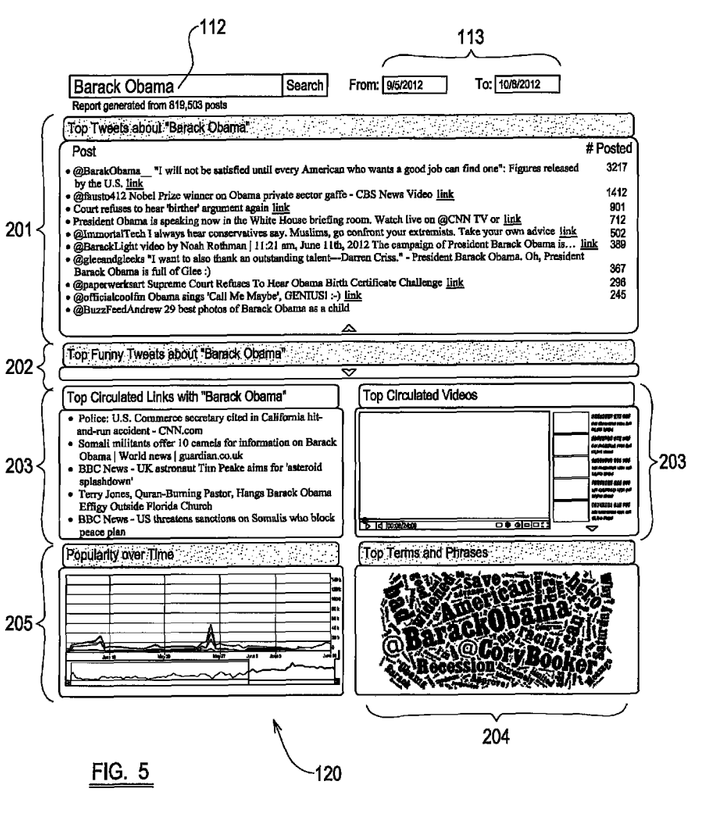
FIG. 5 is an example of a preferred sample output report according to another embodiment of the present invention.
Figure 6:
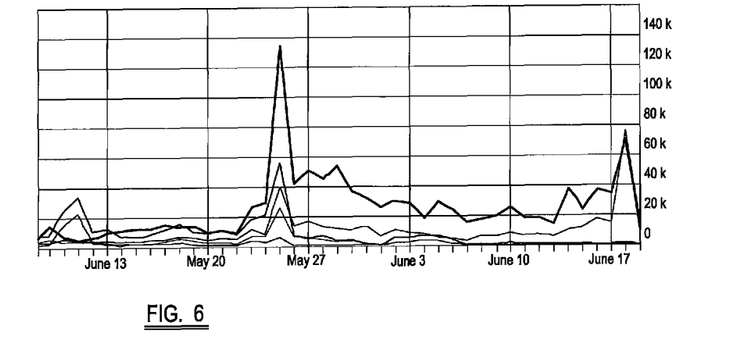
FIG. 6 is an example of a preferred sample output report according to a further embodiment of the present invention.

The number of tweets across time is plotted and presented to the user in an interactive graph, see FIGS. 4, 5 and 6. The time unit used in our system was a day, but the system can be configured for other time units. Also, the user has the option to change the granularity of the view and explore the resulting report day-by-day and navigate through the specified period of time to see a summary for each day individually.

A report generator 117 is provided which takes the extracted information 201-205 from the retrieved tweets and creates a summarised report 120 preferably presented in a user-friendly standardised or customised format: where top tweets, top funny tweets, and most circulated videos and links are sorted by frequency of appearance. Most frequent terms and phrases are presented in the form of tag-cloud. A time-series graph shows the popularity of the topic on Twitter over time as in FIGS. 4, 5 and 6.

The generated report derived from the microblog information provides a higher level of information content compared to a standard list of word-matched search results. Providing a summarised report derived from what would otherwise be an overload of sparse microblog data provides a user with useful information tailored to the search query term selected by the user.

In embodiments, report generation and microblog retrieval can be pre-configured for special events. The system and method can be used for tasks beyond searching for a given topic on Twitter. Embodiments can be configured to monitor the popularity of specific entities or events over time and report on the same. In such embodiments, the system is fed with a set of fixed queries, and summarized reports are updated continuously at fixed time intervals to provide users with updated reports. Multiple entities can be monitored within a given event, and the relation among these entities can be extracted and plotted in graphs to show the connection among different entities.

Figure 3:
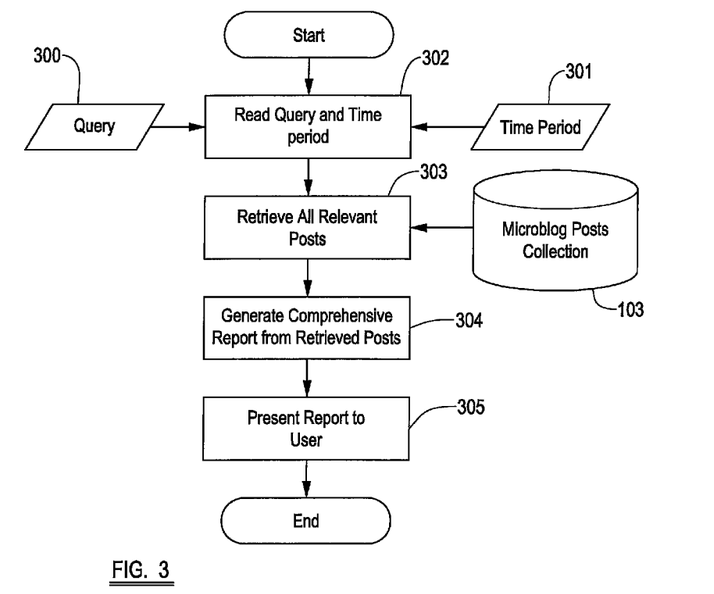
FIG. 3 is a flow chart representing an overview of the method according to an embodiment invention.

FIG. 3 presents the main workflow steps in the system:

Given an information need, such as queries, search social content data for relevant posts All relevant posts are extracted from microblogs Full analysis is applied to the posts to:
  i. Collect and aggregate microblog data and posts that match information need.
  ii. Apply advanced Natural Language Processing (NLP) technologies on posts to extract related events. Some relevant NLP technologies include but not limited to:
    1. Text normalization
    2. Named entity recognition
    3. Keyword/key-phrase extraction
    4. Sentiment analysis
  iii. Plot relationship between information need and the extracted items.
  iv. Navigate the results for given period of time.
  v. Monitor public mood for certain topic, and observe change over time.
  vi. Extract top videos and links related to such events/entity.
  vii. Extract top sarcastic posts and jokes-like tweets for the required event.
  viii. Extract top positive/negative and other type of categorized sentiments posts.

In summary, referring to FIG. 3, a user searches for a particular time-sensitive topic [300] such as an election, a sports event, a natural phenomenon, or an entity such as a person, location, organisation, or product. The user chooses a time span [301]. The composite search query is compiled and interrogates [303] the normalised and indexed microblog database to retrieve all relevant posts satisfying the search query. A report generator analyses the retrieved posts and summarises [304] the microblogs into a customised and comprehensive report from the public microblogs [103]. The report is presented to the user [305].

For the resulting tweets in the specified time-span, embodiments of the present invention generate reports showing the top tweets ("top" means most (re)tweeted), top funny tweets, most circulated videos and links, most popular terms and phrases, and statistics about the entity/event over time. A user can also navigate through the resulting report over time to see how the popularity of a given entity/event has changed. In addition, the system can be configured for automatically collecting tweets related to a given topic to monitor special events for a period of time.

An example of a customised and updated report:

A configuration of a system embodying the present invention monitored the 2012 Egyptian presidential elections and prepared daily reports using the system and method embodying the present invention.

Reports are prepared for the elections in general and for each of the candidates specifically.

In this embodiment of the present invention the system is configured to automatically monitor Arabic tweets on an Egyptian election. Summary reports on the information in the Arabic tweets about the election can be prepared. For example, daily reports are produced on all the electoral candidates based exclusively on tweets, including all the features mentioned earlier. The report is configured also to provide an indication of the relative performance between candidates and plots of their popularity over time.

Data collection

Arabic tweets were collected from Feb. 26, 2012, 3 months before the Egyptian election—roughly 2.6 million Arabic tweets per day. The number of tweets used in daily reports varied dramatically over the three months period. The number of tweets used in reports ranged between 6000 tweets at the end of February up to 377,000 and 158,000 tweets on election days of the first and second election rounds respectively. FIG. 6 shows the time series for all candidates' occurrences on Twitter. The graph has two peaks on May 25, the first round election-day between 13 candidates; and on June 17, the second round election-day between the two frontrunners in round 1. The daily reports were constantly updated using newly found tweets every 10 minutes and aggregation is done day-by-day, where days start from 12 midnight.

Configuring the System—Creating Rich Queries

A set of rich Boolean queries were prepared for collecting the tweets, including queries for 13 candidates running for president and some other entities related to the election, such as people who were expected to run for the elections but did not, top political parties, and governmental organizations related to the elections. Some of the prepared queries were just the name of the candidate or entity, while others required rich Boolean queries to disambiguate them. For example, the candidate " صباحي —(Sabahi)" required a complex query, because his name also means "my morning" in Arabic, yielding many unrelated tweets.

Calculating Candidates Popularity and Relations

The popularity of each candidate was measured by the count of tweets that includes his name. We noticed that the most popular candidate has always been the object of negative and sarcastic tweets, while the second most popular has usually been one of strong candidates with positive/supportive comments. Relative frequency of mentions between candidates was measured by the co-occurrence of candidates in tweets. Anecdotally, we observed that many weeks before election day, co-occurrences of candidate mentions in tweets were more frequent among candidates that are ideologically similar; then as election day drew closer, co-occurrences were based on sub-events such as political debates, mass media appearances, etc.

This tailored example demonstrates how a system and method embodying the present invention can be tailored to provide rich information content derived from a great many microblogs, each containing only sparse information.

In embodiments, a translation module is provided which is configured such that microblogs in a plurality of languages can be used to generate a collection of microblog data in a single language. Translation can be regarded as a normalisation step.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for automatic generation of information-rich content from multiple microblogs, each microblog containing only sparse information, the method comprising:
   collecting a population of microblogs comprising microblog data, each microblog containing a limited number of characters;
   providing a user interface allowing entry of a search query;
   matching a search query entered on the user interface to data in the microblog data, the microblog data based partially on contributor mood;
   providing the results of the matching process as a sub-set of microblog data;
   applying processing techniques to the sub-set of microblog data; wherein processing techniques include:
   using natural language processing techniques to generate at least one category in the sub-set of microblog data, the category based on a link between a sentiment and the sparse information of the sub-set of microblog data;
   monitoring microblog contributor mood for the matched search query and observe change over time;
   generating contributor mood data for an event in the sub-set of microblog data over time based on a microblog and the category, wherein the contributor mood is associated with the category based on a sentiment in the sparse information of the microblog; and
   outputting a group of microblogs based on the sub-set of microblog data associated with the contributor mood data of the event, wherein each microblog is based on a correlation between the matched search query and the sentiment associated with the contributor mood data.

2. The method according to claim 1, wherein the sentiment is one of a set of sentiments including at least one of positive, negative, funny, sad, happy, associated with a mood category in the microblogs, the method comprising:
   dividing the sub-set of microblog data into different categories of microblog based on the sentiment; and
   incorporating results for each of the different categories in the summary report.

3. The method according to claim 2, wherein the category of microblog is selected from at least one of the following:
   microblogs containing the matched search query;
   microblogs containing sentiment;
   microblogs containing positive/negative sentiments, wherein the positive/negative sentiments include a sub-set of sentiments in each of the positive/negative sentiments;
   microblogs containing other forms of sentiment;
   microblogs containing sarcastic posts and/or joke-like posts related to the search query;

microblogs containing links related to the search query; and microblogs containing video links related to the search query.

4. The method according to claim 3, wherein the natural language processing is selected from at least one of the following:
   text normalization
   named entity recognition
   keyword/key-phrase extraction
   sentiment analysis.

5. The method according claim 4, wherein the processing comprises identifying URLs and expanding URLs.

6. The method according to claim 4, wherein the summary report provides at least one of the following:
   a relationship plot between information need and the extracted items;
   navigation of the results over a user-selected time window;
   extracted top videos and links related to such events/entity;
   extracted top sarcastic posts and jokes-like tweets for the required event; and
   extracted top positive/negative and other type of categorized sentiments posts.

7. The method according to claim 4, wherein the microblog is selected from the group comprising: a post on a social networking site; a comment on a news article; a comment or a post on a forum; a comment on a social networking site; and other user generated content (UGC).

8. The method according to claim 7, wherein the microblogs are normalised into microblog data having a predetermined format.

9. The method according to claim 8, wherein normalised microblog data is stored in an index of microblogs to comprise the population of microblogs.

10. The method according to claim 8, wherein the predetermined format includes at least a selection of the following:
    microblog text;
    microblog identifier; and
    microblog time-stamp.

11. A system for automatic generation of information-rich content from multiple microblogs, each microblog containing only sparse information, the system including:
    a computing device having a processor and a memory: and
    a storage device;
    the computing device being configured to perform the method according to any preceding claim.

12. The system according to claim 11, further including a visual display for displaying an interface to a user, and to receive a search query from a user, such that the input of a search query by the user causes the computing device to output to the interface a summary report of the processed sub-set of microblog data corresponding to the search query.

13. A computer-readable medium storing instructions which when executed to run on a processor cause the processor to perform the steps according to the method of claim 1.

14. A system for automatically generating information-rich content from multiple microblogs, each microblog containing only sparse information, the system comprising:
    a collection of microblogs comprising microblog data, each microblog containing a limited number of characters, the microblog data based at least partially on contributor mood;
    a user interface allowing entry of a search query; and
    a hardware processor configured to:
       match a search query entered on the user interface to data in the microblog data;
       generate at least one category in the matched microblog data, the category based on a link between a sentiment and the sparse information of the matched microblog data;
       monitor microblog contributor mood for the matched search query and observe change over time generating contributor mood data for an event in the sub-set of microblog data over time based on a microblog and the category, wherein the contributor mood is associated with the category based on a sentiment in the sparse information of the microblog; and
       output a group of microblogs based on the sub-set of microblog data associated with the contributor mood data of the event, wherein each microblog is based on a correlation between the matched search query and the sentiment associated with the contributor mood data.

15. The method according to claim 1, wherein the contributor mood is based at least partially on emoticons, wherein the sentiment is one of a set of sentiments including at least one of positive, negative, funny, sad, associated with a mood category in the microblogs.

* * * * *

UNITED STATES PATENT AND TRADEMARK OFFICE
CERTIFICATE OF CORRECTION

| | | |
|---|---|---|
| PATENT NO. | : 9,990,368 B2 | Page 1 of 1 |
| APPLICATION NO. | : 14/408732 | |
| DATED | : June 5, 2018 | |
| INVENTOR(S) | : Magdy Walid et al. | |

It is certified that error appears in the above-identified patent and that said Letters Patent is hereby corrected as shown below:

On the Title Page

Column 1, after Item (65) Prior Publication Data, Sep. 17, 2015, insert:
-- (30) Foreign Application Priority Data
July 4, 2012 (GB)..................................................1211853.5 --

In the Claims

Column 13, Line 12, Claim 5, after "according" insert -- to --

Column 14, Line 2, Claim 11, delete "claim." and insert -- claim 1. --

Signed and Sealed this
Twenty-first Day of August, 2018

Andrei Iancu
*Director of the United States Patent and Trademark Office*